United States Patent
Sevindik et al.

(10) Patent No.: US 9,930,423 B1
(45) Date of Patent: Mar. 27, 2018

(54) DYNAMIC TRANSMISSION TIME INTERVAL BUNDLING FOR MULTICAST VIDEO

(71) Applicant: Sprint Spectrum LP, Overland Park, KS (US)

(72) Inventors: Volkan Sevindik, Reston, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/504,566

(22) Filed: Oct. 2, 2014

(51) Int. Cl.
| | |
|---|---|
| H04N 7/16 | (2011.01) |
| H04N 21/6405 | (2011.01) |
| H04N 21/658 | (2011.01) |
| H04H 20/72 | (2008.01) |
| H04N 21/414 | (2011.01) |
| H04N 21/61 | (2011.01) |
| H04H 20/57 | (2008.01) |

(52) U.S. Cl.
CPC ........ *H04N 21/6405* (2013.01); *H04H 20/57* (2013.01); *H04H 20/72* (2013.01); *H04N 21/41407* (2013.01); *H04N 21/6131* (2013.01); *H04N 21/6137* (2013.01); *H04N 21/658* (2013.01)

(58) Field of Classification Search
CPC ............ H04N 21/6405; H04N 21/658; H04N 21/41407; H04N 21/6131; H04N 21/6137
See application file for complete search history.

(56) References Cited

U.S. PATENT DOCUMENTS

| | | | |
|---|---|---|---|
| 2002/0129313 A1* | 9/2002 | Kubo ................ | H03M 13/6561 714/752 |
| 2010/0067412 A1 | 3/2010 | Kitazoe et al. | |
| 2011/0200020 A1 | 8/2011 | Xu et al. | |
| 2012/0294210 A1* | 11/2012 | Jiang .................... | H04L 1/1887 370/280 |
| 2013/0182705 A1* | 7/2013 | Avni ................ | H04N 21/23439 370/389 |

* cited by examiner

*Primary Examiner* — Yassin Alata (57) ABSTRACT

Video is multicast to a group of wireless devices as a series of video segment files containing the video frame data for a period of the video stream. After receiving a video segment file, the wireless devices report about the quality of their reception of the video segment. If a threshold percentage (or number) of wireless devices report they experienced poor reception of a video segment, the number of subframes (i.e., transmission time intervals) used in a frame to multicast the video is increased. In other words, if the number of wireless devices that report they experienced poor reception of a video segment is higher than some threshold, the number of subframes allocated to redundantly transmit the streaming video data is increased.

13 Claims, 6 Drawing Sheets

DYNAMIC TRANSMISSION TIME INTERVAL BUNDLING FOR MULTICAST VIDEO

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

The significant expansion of wireless communication networks has enabled many services and applications that use wireless devices. Some of these services involve the transmission of live video content a large number of users simultaneously and in real-time. These types of services can be characterized as being a one-to-many transmission model (as opposed to a one-to-one transmission model—a.k.a., unicast). The one-to-many transmission model (a.k.a., broadcast or multicast) allows, much like analog television, multiple users to receive the same data simultaneously via a wireless over the air interface.

Overview

In an embodiment, a method of operating a communication system includes multicasting first video frame data to a plurality of wireless devices. This video frame data is multicast using a wireless link which is using a first number of transmission subframes for the multicast video data. From the plurality of wireless devices, a first plurality of reception reports associated with the first video frame data are received. In response to the plurality of reception reports meeting a threshold criteria, second video frame data is multicast to the plurality of wireless devices using a second number of transmission subframes.

In an embodiment, a method of multicasting a video to a plurality of wireless devices includes wirelessly multicasting a first video segment file to the plurality of wireless devices using a first selected amount of subframe bundling. From the plurality of wireless devices, a first plurality of reception information reports associated with reception of the first video segment file are received. In response to the first plurality of reception information reports indicating that the reception of the first video segment file meets a first threshold criteria, a second selected amount of subframe bundling is selected. A second video segment file is multicast to the plurality of wireless devices using the second selected amount of subframe bundling.

In an embodiment, a communication system comprises an access node configured to receive a first set of reception information reports. These reception information reports are associated with a first video segment file being which was multicast to a plurality of wireless devices by the access node using a first level of subframe bundling. The communication system also includes a processing node configured to receive the first set of reception information reports. In response to the first set of reception information reports meeting a threshold criteria, the processing node configures the access node to multicast a second video segment file using a second level of subframe bundling.

DETAILED DESCRIPTION

In an embodiment, real-time video is multicast to a group of wireless devices as a series of video segment files containing the video frame data (and audio) for a period of the video stream. After receiving a video segment file, the wireless devices report about the quality of their reception of the video segment. If a threshold percentage (or number) of wireless devices report they experienced poor reception of a video segment, the number of subframes (i.e., transmission time intervals) used in a frame to multicast the video is increased. In other words, if the number of wireless devices that report they experienced poor reception of a video segment is higher than some threshold, the number of subframes allocated to redundantly transmit the streaming video data is increased. Likewise, when the number of wireless devices that received erroneous file fragments is lower than some threshold, the number of the number of subframes allocated to redundantly transmit the streaming video data is can be decreased. In this manner, the number of wireless devices having a poor quality of experience receiving the video is reduced.

Figure 1:
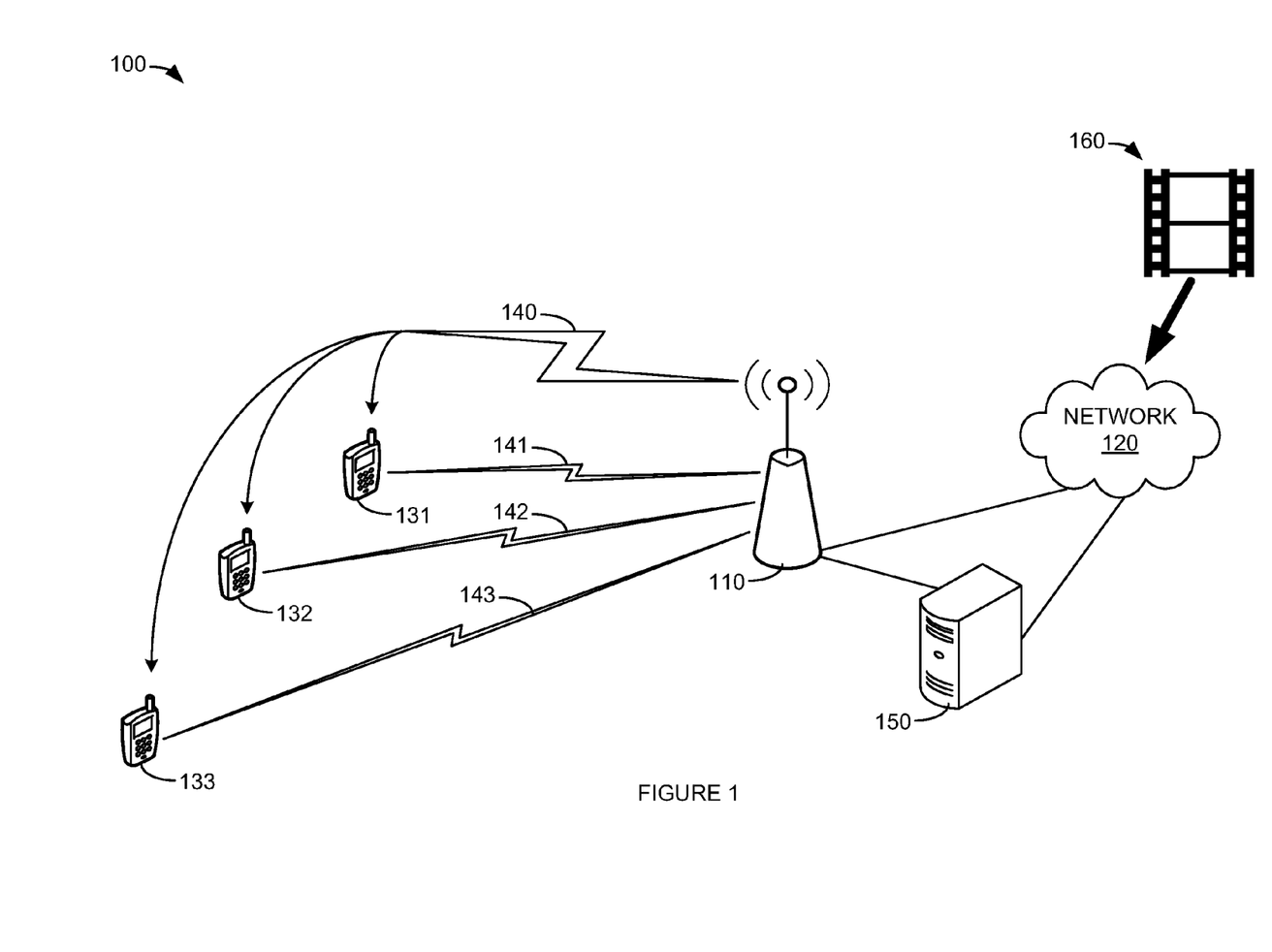
FIG. 1 is a block diagram illustrating a communication system.

FIG. 1 is a block diagram illustrating a communication system. In FIG. 1, communication system 100 comprises access node 110, network 120, wireless device 131, wireless device 132, wireless device 133, processing node 150, and video frame data 160. Access node 110 is operatively coupled to network 120, processing node 150, and video frame data 160. Access node 110 is operatively coupled to multicast (broadcast) video frame data 160 to wireless devices 131-133 via multicast wireless link 140. Wireless device 131 can establish a bidirectional unicast session with access node 110 via wireless link 141. Wireless device 132 can establish a bidirectional unicast session with access node 110 via wireless link 142. Wireless device 133 can establish a bidirectional unicast session with access node 110 via wireless link 142. Processing node 150 is operatively coupled to network 120.

Communication system 100 is a communication network that can provide wireless communication to wireless devices 131-133. Network 120 is a communication network that can provide communication between access node 110 and other wired or wireless networks. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between access node 110 and network 120 can be, for example, twisted pair cable, coaxial cable or fiber optic cable, or combinations thereof. Wireless links 140-143 can be a radio frequency, microwave, infrared, or other similar signal that uses orthogonal frequency division multiplexing (OFDM). Wireless links 140-143 can use a suitable communication protocol, for example, Worldwide Interoperability for Microwave Access (WiMAX), or Long Term Evolution (LTE), or combinations thereof. Other wireless protocols can also be used.

Other network elements may be present in communication system 100 (and present in wireless network 120, in particular) to facilitate wireless communication to/from wireless devices 131-133 but are omitted for clarity, such as base stations, base station controllers, gateways, mobile switching centers, dispatch application processors, and location registers such as a home location register or visitor location register. Furthermore, other network elements may be present to facilitate communication between access node 110 and network 120 which are omitted for clarity, including additional processing nodes, routers, gateways, and physical and/or wireless data links for carrying data among the various network elements.

Wireless devices 131-133 may be any devices, systems, combination of devices, or other such communication platforms capable of communicating wirelessly with access node 110. One or more of wireless devices 131-133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with via access node 110, and network 120. Other types of communication platforms are possible.

Wireless devices 131-133 may establish communication sessions with access node 110 in order to receive communication service. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access node 110 is a network node capable of providing wireless communication to wireless devices 131-133. Access node 110 can be, for example, a base transceiver station, a radio access node, an eNodeB device, or an enhanced eNodeB device. Access node 110 can communicate information, such as data files, to wireless devices via multicast wireless link 140. Access node 110 can communicate information to and/or from wireless devices 131-133 via wireless links 141-143, respectively. Access node 110 may forward data (e.g., operating system files) and/or multimedia data (e.g., audio, video, A/V, video data 160, or other multimedia content) received from network 120 to wireless devices 131-133 via multicast wireless link 140. In an embodiment, multicast wireless link 140 conforms to the Multimedia Broadcast Multicast Service (MBMS) and/or enhanced Multimedia Broadcast Multicast Service (eMBMS) specification.

Processing node 150 may perform certain functions related to allocation of air-interface resources (e.g., resource blocks in an LTE specified system) used by access node 110 or other access nodes (not shown in FIG. 1). In addition to determining the allocation of air interface resources in the time and frequency domain, processing node 150 may determine further details of the air interface configuration used by access node 110. For example processing node 150 may determine the modulation and coding scheme used by multicast wireless link 140. In an embodiment, processing node 150 may be, or be part of, access node 110.

In an embodiment, communication system 100 uses Dynamic Adaptive Streaming over HTTP (DASH—a.k.a., MPEG-DASH) to deliver video frame data 160 received from network 120 to wireless devices 131-133 via multicast wireless link 140. MPEG-DASH works by breaking video content (e.g., video frame data 160) into a sequence of small video file segments. Each video file segment contains a short interval of playback time of video content that is potentially many hours in duration—such as a movie or the live broadcast of a sports event. The video content is made available at a variety of different bit rates (i.e., alternative segments encoded at different bit rates covering aligned short intervals of playback time.) As the content is played back by a wireless device 131-133, the respective wireless device 131-133 automatically selects from the alternative versions (i.e., adaptation set) of the next segment to playback based on the current reception conditions the respective wireless device 131-133 is experiencing. The wireless device 131-133 selects an alternative with the highest bit rate that the wireless device 131-133 can receive and decode in time for playback without causing stalls or rebuffering events in the playback. Thus, a wireless device 131-133 can seamlessly adapt to changing network conditions, and attempts to provide high quality playback without stalls or rebuffering events.

Periodically, (e.g., after each period or video segment file), wireless devices 131-133 report information to access node 110 and processing node 150 about their reception of the video associated with the preceding period. Wireless devices 131-133 can report information to access node 110 and processing node 150 about their reception of the video segment file using wireless links 141-143. Detailed and undetailed reports can be made by wireless devices 131-133. An undetailed report may be associated with a single indicator of the quality of experience associated with a respective wireless device 131-133. Based on the reports from wireless devices 131-133, communication system 100 determines whether a threshold number (or percentage) of wireless devices 131-133 have reported an unsatisfactory (e.g., less than minimum desired) quality of experience.

If communication system 100 determines a threshold percentage (or number) of wireless devices 131-133 report reported an unsatisfactory experience, processing node 150 selects an increased number of transmission time intervals (a.k.a., subframes) in each frame to multicast video frame data 160. In other words, if the number of wireless devices 131-133 that report an unsatisfactory experience is higher than a selected threshold, the number of redundant transmission time intervals bundled by access node 110 to transmit video frame data 160 is increased by processing node 150. Likewise, when the number of wireless devices 131-133 that reported an unsatisfactory experience is lower than some threshold, the number of the number of redundant transmission time intervals bundled by access node 110 to transmit video frame data 160 can be decreased by processing node 150.

For example, for a first period of video frame data 160 (i.e., interval), processing node 150 may configure access node 110 to use only one transmission subframe per transmission frame to multicast video frame data 160 to wireless devices 131-133. If, based on the reception information reports received from wireless devices 131-133, it is determined that a threshold percentage or more (e.g., >1%) of wireless devices 131-133 report an unsatisfactory experience receiving video content 160, processing node 150 would elect to increase the number of transmission subframes per transmission frame used to transmit each video file segment during the next period to two. Thus, for a second video file segment (i.e., interval), processing node 150 would configure access node 110 to use two transmission subframes per transmission frame to transmit this video file segment. Each of these two bundled transmission subframes may have different error correction encoding. In addition, the two bundled transmission subframes may include error correction encoding that is associated with both subframes. The error correction encoding that is associated with both subframes may be a different encoding than was used to encode the individual subframes.

If, after multicasting the second video segment file, the reception information reports received from wireless devices 131-133 indicate that the threshold percentage or more (e.g., >1%) of wireless devices 131-133 report an unsatisfactory experience, processing node 150 would increase the number of transmission subframes per transmission frame used to transmit a third video segment file to three, and so on.

Communication system 100 may also reduce the number of redundant transmission subframes per transmission frame used to transmit a third video segment file when another threshold condition is met. For example, for a video segment file (i.e., interval) access node 110 may be configured to transmit using four transmission subframes per transmission frame. If, based on the reception information reports received from wireless devices 131-133, it is determined that a threshold percentage or less (e.g., <0.01%) of wireless devices 131-133 report an unsatisfactory experience, processing node 150 can elect to decrease the number of redundant transmission subframes per transmission frame for the next video segment file to three.

Figure 2:
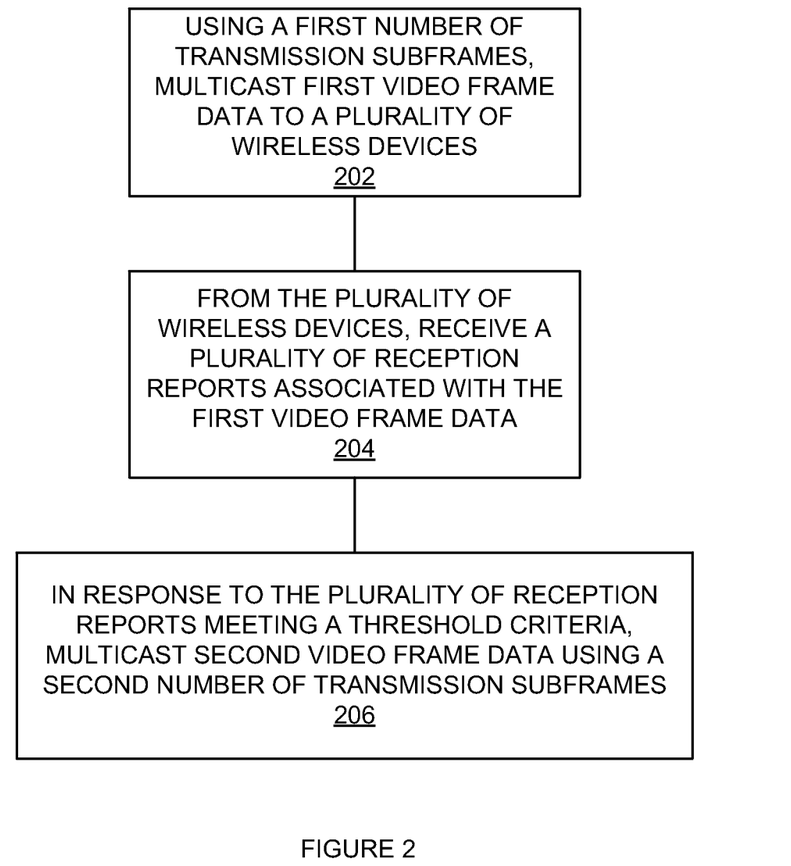
FIG. 2 is a flowchart illustrating a method of operating a communication system.

FIG. 2 is a flowchart illustrating a method of operating a communication system. The steps illustrated in FIG. 2 may be performed by one or more elements of communication system 100. Using a first number of transmission subframes, first video frame data is multicast to a plurality of wireless devices (202). For example, using a first number of transmission subframes (i.e., transmission time intervals) per transmission frame, a first video segment file is multicast by access node 110 to wireless devices 131-133 via multicast wireless link 140.

From the plurality of wireless devices, a plurality of reception reports associated with the first video frame data is received (204). For example, access node 110 and/or processing node 150 may receive, from wireless devices 131-133 via wireless links 141-143 reception information reports. These reception information reports may indicate the quality of reception experienced by a respective wireless device 131-133 while receiving the first video segment file from access node 110. Wireless devices 131-133 may report to access node 110 reception information, receptions statistics, reception performance, an indicator of a quality of experience, and/or error indicator(s) associated with each respective wireless device's 131-133 reception of the first video segment file. Wireless devices 131-133 may use wireless links 141-143 to report the reception information, receptions statistics, reception performance, indicator of a quality of experience, and/or error indicator(s) associated with each respective wireless device's 131-133 reception of the first segment file to access node 110 and/or processing node 150.

In response to the plurality of reception reports meeting a threshold criteria, second video frame data is multicast using a second number of transmission subframes (206). For example, using a second number of transmission subframes (i.e., transmission time intervals) per transmission frame, a second video segment file is multicast by access node 110 to wireless devices 131-133 via multicast wireless link 140. If the threshold criteria is associated with a large number (or percentage) of wireless devices 131-133 indicating an unsatisfactory experience, this second number of transmission subframes per transmission frame may be greater than the first number of transmission subframes per transmission frame. If the threshold criteria is associated with a large number (or percentage) of wireless devices 131-133 indicating a satisfactory experience, this second number of transmission subframes per transmission frame may be less than the first number of transmission subframes per transmission frame.

Figure 3:
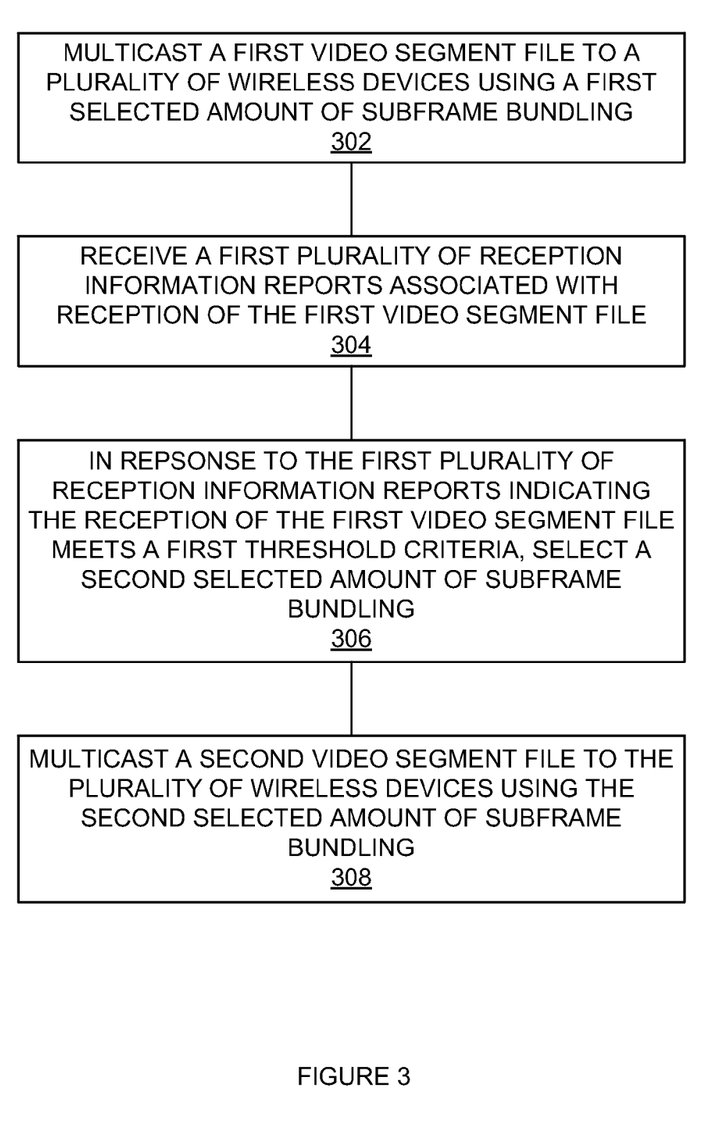
FIG. 3 is a flowchart illustrating a method of multicasting a video segment file.

FIG. 3 is a flowchart illustrating a method of multicasting a video segment file. The steps illustrated in FIG. 3 may be performed by one or more elements of communication system 100. A first video segment file is multicast to a plurality of wireless devices using a first selected amount of subframe bundling (302). For example, access node 110 may multicast, to wireless devices 131-133 a first video segment file using a first number (e.g., two) of bundled (i.e., redundant) transmission time intervals per transmission frame to carry the data for this first video segment file.

A first plurality of reception information reports associated with reception of the first video segment file are received (304). For example, access node 110 may receive, from wireless devices 131-133, respective reception reports associated with the reception of the first video segment file that was multicast using the first level of subframe bundling. These reception information reports may include an indicator of a quality of experience, an indicator of air-interface conditions, receptions statistics, reception performance, and/or error indicator(s) associated with each respective wireless device's 131-133 reception of the video segment file multicast using the first level of subframe bundling.

In response to the first plurality of reception information reports indicating the reception of the first video segment file meets a first threshold criteria, a second selected amount of subframe bundling is selected (306). For example, when the reception information reports indicate that a threshold percentage or more (e.g., >1%) of wireless devices 131-133 report an unsatisfactory quality of experience (e.g., stalls or rebuffering), processing node 150 can select an increased number of bundled transmission time intervals per transmission frame to be used to carry the data while multicasting another video segment file (of the entire video.)

A second video segment file is multicast to the plurality of wireless devices using the second selected amount of subframe bundling (308). For example, during the multicasting of a different video segment file by access node 110 via multicast wireless link 140, access node 110 may use an increased (or decreased) number of redundant transmission time intervals (e.g., 4) to carry the video data. While transmitting the second video segment file, access node 110 may use the number of bundled subframes selected in box 306.

Figure 4:
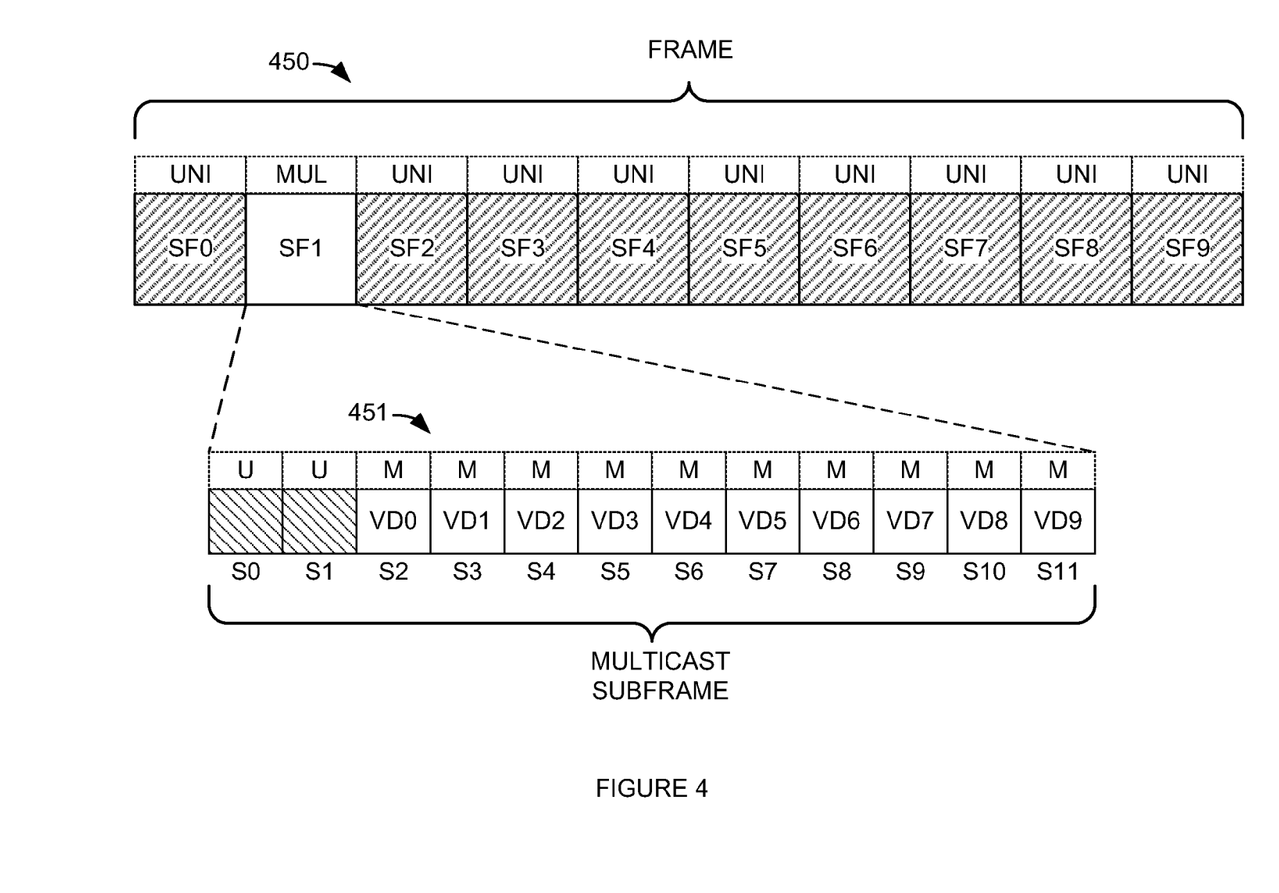
FIG. 4 is an illustration of a frame with a multicast subframe.

FIG. 4 is an illustration of a frame with a multicast subframe. The frame illustrated in FIG. 4 may be transmitted by communication system 100 and access node 110, in particular. In FIG. 4, transmission frame 450 includes subframes SF0-SF9. Subframes SF0, and SF2-SF9 are allocated to unicast transmissions. Subframe SF1 451 is allocated to carry multicast data (e.g., video frame data 160.) Subframe SF1 451 includes air-interface resource blocks S0 and S1 that are allocated to carry unicast data. Subframe SF1 451 also includes air-interface resource blocks S2-S11 that are allocated to carry multicast data. The multicast data being carried by air-interface resource blocks S2-S11 is illustrated as video data VD0-VD9, respectively.

Figure 5:
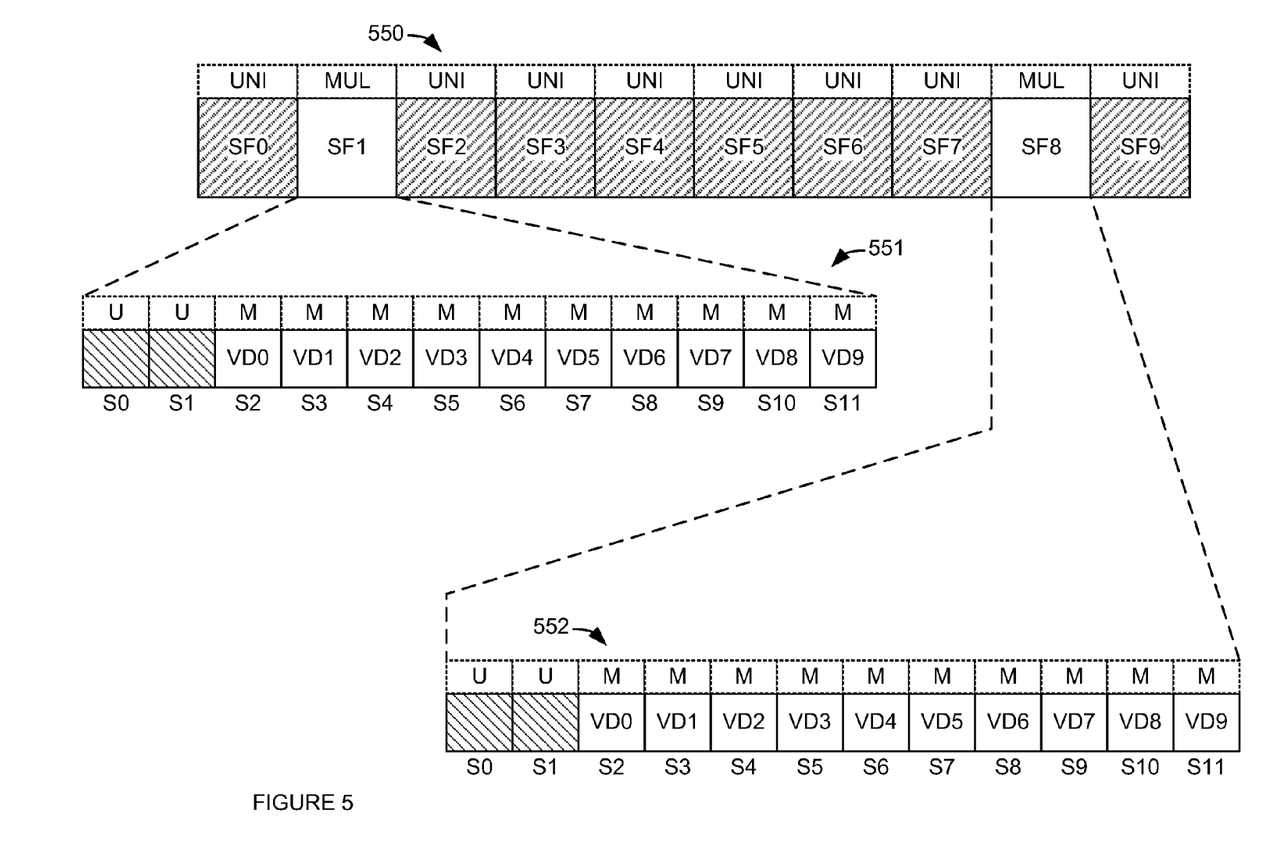
FIG. 5 is an illustration of a frame with subframe bundling.

FIG. 5 is an illustration of a frame with subframe bundling. The frame illustrated in FIG. 5 may be transmitted by communication system 100 and access node 110, in particular. In FIG. 5, transmission frame 550 includes subframes SF0-SF9. Subframes SF0, SF2-SF7, and SF9 are allocated to unicast transmissions. Subframe SF1 551 is allocated to carry multicast data (e.g., video frame data 160.) Subframe SF8 552 is also allocated to carry multicast data. Subframe SF1 551 includes air-interface resource blocks S0 and S1 that are allocated to carry unicast data. Subframe SF1 551 also includes air-interface resource blocks S2-S11 that are allocated to carry multicast data. The multicast data being carried by air-interface resource blocks S2-S11 is illustrated as video data VD0-VD9, respectively. Likewise, Subframe SF8 552 includes air-interface resource blocks S0 and S1 that are allocated to carry unicast data. Subframe SF8 552 also includes air-interface resource blocks S2-S11 that are allocated to carry multicast data. The multicast data being carried by resource blocks S2-S11 is illustrated as video data VD0-VD9, respectively. Thus, since VD0-VD9 appears in both subframe SF1 and SF8, it should be understood that the video data VD0-VD9 is being carried (transmitted) by air-interface resource blocks in multiple (i.e., bundled) subframes (i.e., transmission time intervals). Accordingly, the subframe bundling level illustrated in FIG. 5 may be referred to as bundling two transmission time intervals.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, network 120, wireless device 131, wireless device 132, wireless device 133, wireless device 126, and/or processing node 150.

Figure 6:
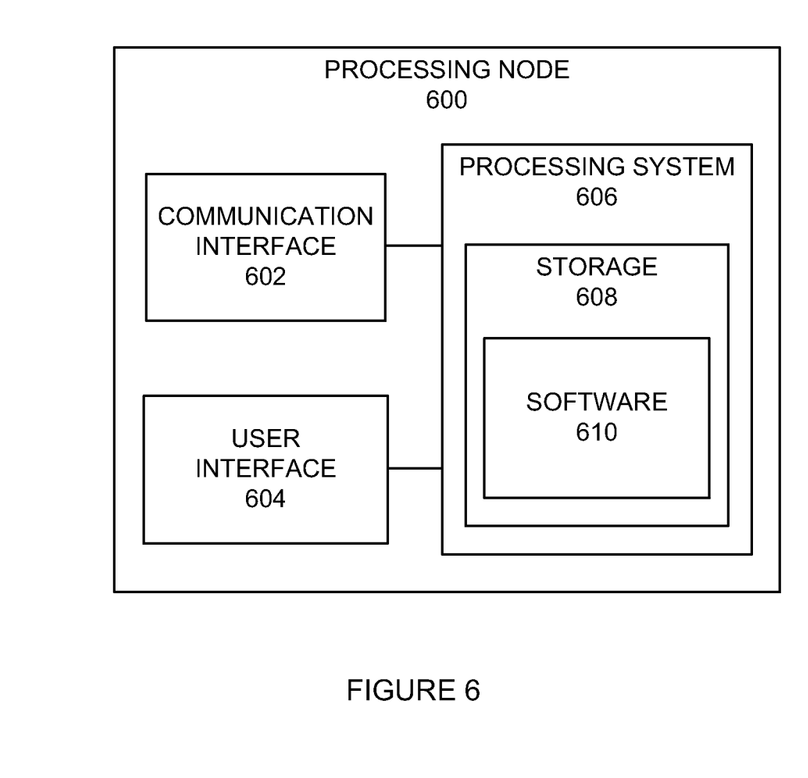
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access node 110, network 120, wireless device 131, wireless device 132, wireless device 133, wireless device 126, and/or processing node 150. Processing node 600 can also be an adjunct or component of a network element, such as an element of access node 110, network 120, wireless device 131, wireless device 132, wireless device 133, wireless device 126, processing node 150, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   multicasting a first segment of a video to a plurality of wireless devices using a wireless link and using a number of transmission subframes per frame, wherein the first segment of the video is encoded using a first forward error correction code encoding that is associated with the number of transmission subframes per frame;
   receiving, from the plurality of wireless devices, a first plurality of reception reports associated with the first video frame data, wherein the first plurality of reports comprises at least a detailed report and an undetailed report, the detailed report comprising any combination of reception information, receptions statistics, reception performance, indicators of a quality of experience, and an error indicator, and wherein the undetailed report comprises a single indicator of a quality of experience;
   in response to the plurality of reception reports meeting a threshold criteria, increasing the number of transmission subframes per frame, and multicasting a second segment of the video to the plurality of wireless devices using the wireless link and using the increased number of transmission subframes per frame,
   wherein the second segment of the video is included within each of the increased number of transmission subframes,
   wherein the second segment of the video included within a first transmission subframe of the increased number of transmission subframes is encoded using a different forward error correcting code encoding than the second segment of the video included within a second transmission subframe of the increased number of transmission subframes, and
   wherein the forward error correction code encoding of the second video segment in each of the increased number of transmission subframes is different from the first forward error correction code encoding of the first segment of the video transmitted using the number of transmission subframes.

2. The method of claim 1, wherein the number of transmission subframes used to transmit the first segment is one transmission subframe per frame.

3. The method of claim 1 wherein the threshold criteria comprises a percentage of the plurality of wireless devices reporting an unsatisfactory experience.

4. The method of claim 1, further comprising:
   multicasting a third segment of the video to the plurality of wireless devices using the wireless link and using the increased number of transmission subframes;
   receiving, from the plurality of wireless devices, a second plurality of reception reports associated with third segment of the video; and,
   in response to the second plurality of reception reports not meeting the threshold criteria, multicasting a fourth segment of the video to the plurality of wireless devices using the wireless link and using a reduced number of transmission subframes.

5. A method of multicasting a video to a plurality of wireless devices, comprising:
   wirelessly multicasting a first video segment to the plurality of wireless devices using a first selected amount of subframe bundling, wherein the first video segment is encoded using a first forward error correction code encoding that is associated with the first selected amount of subframe bundling;
   receiving, from the plurality of wireless devices, a first plurality of reception information reports associated with reception of the first video segment, wherein the first plurality of reception information reports comprises at least a detailed report and an undetailed report, the detailed report comprising any combination of reception information, receptions statistics, reception performance, indicators of a quality of experience, and an error indicator, and wherein the undetailed report comprises a single indicator of a quality of experience;
   in response to the first plurality of reception information reports indicating the reception of the first video segment file meets a first threshold criteria, selecting a second selected amount of subframe bundling, the second selected amount of subframe bundling comprising an increased number of transmission subframes within a wireless transmission frame; and,
   wirelessly multicasting a second video segment to the plurality of wireless devices using the second selected amount of subframe bundling,
   wherein the second video segment is included within each of the increased number of transmission subframes,
   wherein the second video segment included within a first transmission subframe of the increased number of transmission subframes is encoded using a different forward error correcting code encoding than the second video segment included within a second transmission subframe of the increased number of transmission subframes, and
   wherein the forward error correction code encoding of the second video segment in each of the increased number of transmission subframes is different from the first forward error correction code encoding of the first segment of the video transmitted using the number of transmission subframes.

6. The method of claim 5, wherein the first selected amount of subframe bundling corresponds to using one subframe per wireless transmission frame.

7. The method of claim 6, wherein the second selected amount of subframe bundling corresponds to using two subframes per wireless transmission frame.

8. The method of claim 5, further comprising:
   wirelessly multicasting a third video segment to the plurality of wireless devices using the second selected amount of subframe bundling;
   receiving, from the plurality of wireless devices, a second plurality of reception reports associated with third video segment file; and, in response to the second plurality of reception reports not meeting the threshold criteria, multicasting a fourth video segment to the plurality of wireless devices using the first selected amount of subframe bundling.

9. A communication system, comprising:

an access node configured to receive a first set of reception information reports associated with a first video segment being multicast to a plurality of wireless devices by the access node using a first level of subframe bundling, wherein the first video segment is encoded using a first forward error correction code encoding that is associated with the first selected amount of subframe bundling, and wherein the first plurality of reception information reports comprises at least a detailed report and an undetailed report, the detailed report comprising any combination of reception information, receptions statistics, reception performance, indicators of a quality of experience, and an error indicator, and wherein the undetailed report comprises a single indicator of a quality of experience; and a processing node configured to receive the first set of reception information reports and, in response to the first set of reception information reports meeting a threshold criteria, configure the access node to multicast a second video segment using a second level of subframe bundling, the second selected amount of subframe bundling comprising an increased number of transmission subframes within a wireless transmission frame, each of the increased number of transmission subframes including the second video segment, wherein the second video segment included within a first transmission subframe of the increased number of transmission subframes is encoded using a different forward error correcting code encoding than the second video segment included within a second transmission subframe of the increased number of transmission subframes, and wherein the forward error correction code encoding of the second video segment in each of the increased number of transmission subframes is different from the first forward error correction code encoding of the first segment of the video transmitted using the number of transmission subframes.

10. The communication system of claim 9, wherein the access node is further configured to receive a second set of reception information reports associated with the multicast of a third video segment to the plurality of wireless devices.

11. The communication system of claim 10, wherein the processing node is further configured to receive the second set of reception information reports and, in response to the second set of reception information reports not meeting the threshold criteria, configure the access node to multicast a fourth video segment using the first level of subframe bundling.

12. The communication system of claim 9, wherein the first level of subframe bundling corresponds to using a single subframe per wireless transmission frame.

13. The communication system of claim 9, wherein the second level of subframe bundling corresponds to using two subframes per wireless transmission frame.

* * * * *